(12) United States Patent
Jacoby et al.

(10) Patent No.: US 12,397,377 B2
(45) Date of Patent: Aug. 26, 2025

(54) ALUMINUM ALLOY MULTI-LAYERED BRAZING SHEET MATERIAL FOR FLUXFREE BRAZING

(71) Applicant: Aleris Rolled Products Germany GmbH, Koblenz (DE)

(72) Inventors: Bernd Jacoby, Limburg (DE); Fabian Ritz, Ötzingen (DE); Arne Schlegel, Aachen (DE); Steven Kirkham, Ransbach-Baumbach (DE); Axel Alexander Maria Smeyers, Heist op den Berg (BE)

(73) Assignee: NOVELIS KOBLENZ GMBH, Koblenz (DE)

( * ) Notice: Subject to any disclaimer, the term of this patent is extended or adjusted under 35 U.S.C. 154(b) by 372 days.

(21) Appl. No.: 17/758,599

(22) PCT Filed: Jan. 26, 2021

(86) PCT No.: PCT/IB2021/050587
§ 371 (c)(1),
(2) Date: Jul. 11, 2022

(87) PCT Pub. No.: WO2021/152455
PCT Pub. Date: Aug. 5, 2021

(65) Prior Publication Data
US 2023/0049185 A1 Feb. 16, 2023

(30) Foreign Application Priority Data

Jan. 29, 2020 (EP) ..................................... 20154258
Mar. 2, 2020 (EP) ..................................... 20160495

(51) Int. Cl.
B23K 35/28 (2006.01)
B23K 1/00 (2006.01)
(Continued)

(52) U.S. Cl.
CPC ........ B23K 35/0238 (2013.01); B23K 1/0012 (2013.01); B23K 35/286 (2013.01);
(Continued)

(58) Field of Classification Search
CPC ...... B23K 35/286; B32B 15/016; C22C 21/02
(Continued)

(56) References Cited

U.S. PATENT DOCUMENTS

2002/0142185 A1   10/2002  Kilmer
2004/0238605 A1   12/2004  Nishimura et al.
(Continued)

FOREIGN PATENT DOCUMENTS

CN    101715380 A    5/2010
CN    102089117 A    6/2011
(Continued)

OTHER PUBLICATIONS

Indian Application No. 202217033966, "First Examination Report", Nov. 10, 2022, 5 pages.
(Continued)

*Primary Examiner* — Katherine A Christy
(74) *Attorney, Agent, or Firm* — Kilpatrick Townsend & Stockton LLP

(57) ABSTRACT

An aluminium alloy multi-layered brazing sheet product for brazing in an inert-gas atmosphere without a flux includes a core layer made of a 3xxx alloy including 0.20-0.75 wt. % Mg, and provided with a covering clad layer including 2-5 wt. % Si on one or both sides of said 3xxx alloy core layer and a Al—Si brazing clad layer including 7-13 wt. % Si positioned between the 3xxx alloy core layer and the covering clad layer. The covering clad layer has a thickness $X_1$ and the Al—Si brazing clad layer has a thickness $X_2$ and wherein $X_2 \geq 2X_1$. The aluminium alloy multi-layered brazing sheet product can be used in a fluxfree controlled (Continued)

atmosphere brazing (CAB) operation to produce a heat exchanger apparatus.

19 Claims, 2 Drawing Sheets

(51) Int. Cl.
  *B23K 35/02* (2006.01)
  *B32B 15/01* (2006.01)
  *C22C 21/02* (2006.01)
  *B23K 101/14* (2006.01)
(52) U.S. Cl.
  CPC ............ *B32B 15/016* (2013.01); *C22C 21/02* (2013.01); *B23K 2101/14* (2018.08)
(58) Field of Classification Search
  USPC .......................................................... 428/654
  See application file for complete search history.

(56) References Cited

U.S. PATENT DOCUMENTS

| | | | |
|---|---|---|---|
| 2007/0204935 | A1 | 9/2007 | Safrany et al. |
| 2011/0111254 | A1* | 5/2011 | Wittebrood ............ C22C 21/02 228/221 |
| 2015/0037607 | A1 | 2/2015 | Itoh et al. |
| 2015/0053751 | A1 | 2/2015 | Eckhard et al. |
| 2016/0325367 | A1 | 11/2016 | Eckhard et al. |
| 2021/0114144 | A1 | 4/2021 | Chehab et al. |

FOREIGN PATENT DOCUMENTS

| | | | |
|---|---|---|---|
| CN | 102574248 | A | 7/2012 |
| CN | 104395028 | A | 3/2015 |
| CN | 106476359 | A | 3/2017 |
| CN | 108602317 | A | 9/2018 |
| EP | 1306207 | | 5/2003 |
| EP | 2803442 | | 11/2014 |
| EP | 2477783 | | 12/2014 |
| EP | 2821173 | | 1/2015 |
| EP | 2155431 | B1 | 8/2017 |
| EP | 3459676 | | 3/2019 |
| JP | 2001300762 | | 10/2001 |
| JP | 2006509635 | A | 3/2006 |
| JP | 2006175500 | A | 7/2006 |
| JP | 2011251332 | A | 12/2011 |
| JP | 2012236201 | A | 12/2012 |
| JP | 2013505135 | A | 2/2013 |
| JP | 2018184806 | A | 11/2018 |
| JP | 2018197395 | A | 12/2018 |
| JP | 2023505586 | A | 2/2023 |
| WO | 2004112992 | | 12/2004 |
| WO | 2008155067 | A1 | 12/2008 |
| WO | 2010000666 | | 1/2010 |
| WO | 2011034496 | A2 | 3/2011 |
| WO | 2013180630 | | 12/2013 |
| WO | 2016134967 | | 9/2016 |
| WO | 2018184806 | A1 | 10/2018 |
| WO | 2019115422 | | 6/2019 |
| WO | 2019164487 | A1 | 8/2019 |
| WO | 2021255638 | A1 | 12/2021 |

OTHER PUBLICATIONS

Canadian Application No. 3,162,701 , "Office Action", Aug. 25, 2023, 12 pages.
European Application No. 21701608.8 , "Intention to Grant", Jul. 11, 2023, 8 pages.
Japanese Application No. 2022-546140 , "Office Action", Sep. 5, 2023, 13 pages.
"English Translation of CN106476359 A", Mar. 8, 2017, 16 pages.
"English Translation of JP2006175500 A", Jul. 6, 2006, 22 pages.
"English Translation of JP2012236201 A", Dec. 6, 2012, 12 pages.
Chinese Application No. 202180011589.3 , "Notice of Decision to Grant", May 16, 2024, 8 pages.
European Application No. 21701608.8 , "Notice of Opposition", Jul. 12, 2024, 16 pages.
Korean Application No. 10-2022-7018408 , "Office Action", May 16, 2024, 10 pages.
Canadian Application No. 3,162,701 , "Notice of Allowance", Jan. 30, 2024, 1 page.
Canadian Application No. 3,162,701 , "Notice of Allowance", Mar. 27, 2024, 1 page.
Chinese Application No. 202180011589.3 , "Office Action", Sep. 5, 2023, 22 pages.
Chinese Application No. 202180011589.3 , "Office Action", Feb. 19, 2024, 11 pages.
Japanese Application No. 2022-546140 , "Office Action", Feb. 27, 2024, 6 pages.
Long, et al., "Research Progress and Prospects of Aluminum Alloy Brazing Technology", Welding Technology, vol. 46, No. 6, Jun. 28, 2017, pp. 5-13, with translation.
European Application No. 20154258.6 , Extended European Search Report, Mailed On Aug. 13, 2020, 8 pages.
European Application No. 20160495.6 , Extended European Search Report, Mailed On Aug. 25, 2020, 8 pages.
International Application No. PCT/IB2021/050587 , International Search Report and Written Opinion, Mailed On Mar. 19, 2021, 13 pages.

* cited by examiner

ALUMINUM ALLOY MULTI-LAYERED BRAZING SHEET MATERIAL FOR FLUXFREE BRAZING

CROSS-REFERENCE TO RELATED APPLICATIONS

This application claims the benefit of and priority to European Patent Application No. 20154258.6, filed Jan. 29, 2020 and titled "Aluminium alloy multi-layered brazing sheet material for fluxfree brazing," and European Patent Application No. 20160495.6, filed Mar. 2, 2020 and titled "Aluminium alloy multi-layered brazing sheet material for fluxfree brazing," the contents of which are herein incorporated by reference in their entireties.

FIELD

Described herein is an aluminium alloy multi-layered brazing sheet product or material for brazing in an inert gas atmosphere without a flux ("CAB"), comprising a core layer made of a 3xxx-series aluminium alloy and provided with a covering clad layer comprising 2-5 wt. % Si on one or both sides of the core layer and a Al—Si brazing clad layer comprising 6-13 wt. % Si positioned between the core layer and the covering clad layer. Also described herein is a brazed assembly manufactured in a brazing operation, the brazed assembly comprising various components and at least one component being made from the aluminium alloy multi-layered brazing sheet material as described herein.

BACKGROUND

Substrates of aluminium or aluminium alloys in the form of sheets or extrusions are used to make shaped or formed products. In some of these processes, parts of (shaped) aluminium comprising substrates are interconnected. One end of a substrate may be interconnected with the other end or one substrate may be assembled with one or more other substrates. This is commonly done by brazing. In a brazing process, a brazing filler metal or brazing alloy or a composition producing a brazing alloy upon heating is applied to at least one portion of the substrate to be brazed. After the substrate parts are assembled, they are heated until the brazing filler metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet that is typically, but not exclusively, an aluminium alloy of the 3xxx-series, having on at least one surface of the core sheet an aluminium brazing clad layer (also known as an aluminium cladding layer). The aluminium brazing clad layer is made of a 4xxx-series alloy comprising silicon as its main alloying constituent in an amount in the range of 4-20 wt. %. The aluminium brazing clad layer may be coupled or bonded to the aluminium core alloy in various ways known in the art, for example by means of roll bonding, cladding spray-forming or semi-continuous or continuous casting processes.

These aluminium brazing clad layers have a liquidus temperature typically in the range of about 540° C.-620° C. and below the solidus temperature of the aluminium core alloy. Most brazing is done at temperatures between 560° C. and 615° C.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein is an aluminium alloy multi-layered brazing sheet product for brazing in an inert-gas atmosphere without a flux, comprising a core layer made of a 3xxx alloy comprising 0.20% to 0.75 wt. % Mg, and provided with a covering clad layer comprising 2 wt. % to 5 wt. % Si on one or both sides of the 3xxx alloy core layer; and a Al—Si brazing clad layer comprising 7 wt. % to 13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$. Optionally, the 3xxx alloy core layer comprises 0.20% to 0.60% Mg, 0.20% to 0.30% Mg, or 0.40% to 0.55% Mg.

In some cases, the covering clad layer is Bi-free and Li-free. Optionally, the covering clad layer is Mg-free, Bi-free and Li-free, and comprises, in wt. %, Si 2% to 5%;
Fe up to 0.5%;
Mn up to 0.2%;
Cu up to 0.1%;
Zn up to 0.4%;
Ti up to 0.1%;
inevitable impurities, each <0.05%, total <0.15%, and aluminium.

Optionally, the covering clad layer has a Si content of 2.5% to 4.0%.

In some cases, the 3xxx alloy core layer comprises, in wt. %, 0.5% to 1.8% Mn; 0.20% to 0.75% Mg; up to 1.1% Cu; up to 0.2% Si; up to 0.7% Fe; up to 0.3% Cr; up to 0.3% Sc; up to 0.3% Zr and/or V; up to 0.25% Ti; up to 1.2% Zn; unavoidable impurities each up to 0.05% and total up to 0.2%, and aluminium. In some cases, the 3xxx alloy core layer comprises, in wt. %, 0.5% to 1.8% Mn; 0.20% to 0.75% Mg; up to 1.1% Cu; up to 0.4% Si; up to 0.7% Fe; up to 0.3% Cr; up to 0.3% Sc; up to 0.3% Zr and/or V; up to 0.25% Ti; up to 1.2% Zn; unavoidable impurities each up to 0.05% and total up to 0.2%, and aluminium.

Optionally, the 3xxx alloy core layer has a Si content less than 0.10%. Optionally, the 3xxx alloy core layer has a Si content less than 0.40% or less than 0.30%. Optionally, the 3xxx alloy core layer has a Cu content up to 0.15% or a Cu content in the range of 0.15% to 1.1%.

In some cases, the Al—Si brazing clad layer comprises, in wt. %,

Si 7% to 13%;
Mg up to 0.5%;
Fe up to 0.7%;
Cu up to 0.3%;
Mn up to 0.8%;
Zn up to 2%;
Bi up to 0.3%;
Ti up to 0.25%;
unavoidable impurities each <0.05%, total <0.2%, and aluminium.

Optionally, the Al—Si brazing clad layer comprises 10% to 13% Si. Optionally, the Al—Si brazing clad layer comprises 0.02% to 0.5% Mg.

In some cases, the aluminium alloy multi-layered brazing sheet product is surface treated with an alkaline or acidic etchant before a brazing step. Optionally, the covering clad layer has a thickness $X_1$ and the Al—Si brazing clad layer has a thickness $X_2$ and wherein $X_2 \geq 2.5X_1$ or, $X_2 \geq 3X_1$.

Also described herein is a process for the production of a braze heat exchanger, comprising the steps of providing at least one aluminium alloy multi-layered brazing sheet product as described herein and brazing in a flux-free controlled atmosphere brazing (CAB). Optionally, the aluminium alloy multi-layered brazing sheet is surface treated with an alkaline or acidic etchant before a brazing step.

Further described herein is the use of an aluminium alloy multi-layered brazing sheet product as described herein in a flux-free controlled atmosphere brazing (CAB) operation to produce a heat exchanger apparatus.

Other objects and advantages of the invention will be apparent from the following detailed description of non-limiting examples and drawings.

DETAILED DESCRIPTION

Figure 1A:
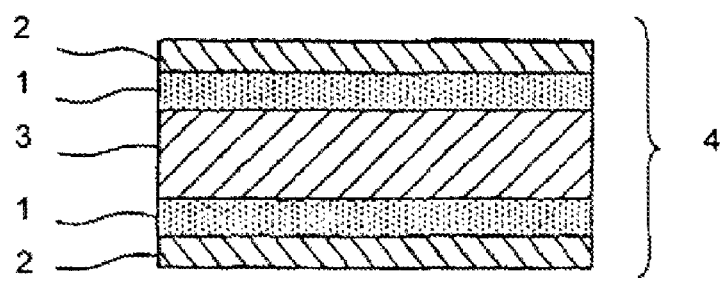
FIGS. 1A and 1B illustrate arrangements of the aluminium alloy multi-layered brazing sheet product as described herein.

As will be appreciated herein below, except as otherwise indicated, aluminium alloy designations and temper designations refer to the Aluminium Association designations in Aluminium Standards and Data and the Registration Records, as published by the Aluminium Association in 2019, and frequently updated, and are well known to the person skilled in the art. The temper designations are laid down in European standard EN515.

For any description of alloy compositions or preferred alloy compositions, all references to percentages are by weight percent unless otherwise indicated.

The term "up to" or "up to about", as employed herein, explicitly includes, but is not limited to, the possibility of zero weight-percent of the particular alloying element to which it refers. For example, up to about 0.20% Cr may include an aluminium alloy having no Cr.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

As used herein, the meaning of "ambient temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

Provided herein is an improved brazing sheet product for brazing in an inert gas atmosphere without a flux. Also provided herein is a multi-layered brazing sheet product for brazing in an inert gas atmosphere.

Specifically, provided herein is an aluminium alloy multi-layered brazing sheet product for brazing in an inert-gas atmosphere without a flux, comprising a core layer made of a 3xxx alloy comprising 0.20-0.75 wt. % Mg, and provided with a covering clad layer comprising 2-5 wt. % Si on one or both sides of said 3xxx alloy core layer and a Al—Si brazing clad layer comprising 7-13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$.

The 3xxx series aluminum alloy core layer comprises 0.20%-0.75% Mg and preferably 0.20-0.60% Mg. Optionally, the 3xxx series aluminum alloy core layer comprises 0.25%-0.75% Mg, 0.30%-0.75% Mg, or 0.35%-0.75% Mg. In one embodiment, the 3xxx series aluminum alloy core layer includes 0.20% to 0.30% Mg. In another embodiment, the 3xxx series aluminum alloy core layer includes has 0.40% to 0.55% Mg.

In some cases, the covering clad layer (also referred to herein as the thin covering layer) has a liquidus temperature substantially higher than the liquidus temperature of the Al—Si brazing clad layer so that the molten brazing material during a subsequent brazing operation at a temperature above the liquidus temperature of the Al—Si alloy brazing clad layer and below the liquidus temperature of the thin covering clad layer causes said Al—Si alloy brazing clad layer to melt down while keeping said thin covering clad layer partially solid to prevent or at least limit oxidation of the brazing material being melted, and then cause the Al—Si alloy brazing material to seep, due to volumetric expansion, through segregation portions of said thin covering clad layer onto a surface of said thin covering clad layer and spread over the surface of said thin covering clad layer to form an emerging surface resulting in a brazed joint. The covering clad layer will eventually dissolve into the molten filler material. The presence of Mg in the Al—Si brazing clad layer facilitates the break-up of the oxide layer on the surface of the brazing sheet product prior to brazing when Mg evaporates at the surface. However, a too high Mg content in the Al—Si brazing clad layer creates an undesired Mg-oxide layer prior to brazing and adversely affects the flow of molten material during brazing. The Al—Si brazing clad layer may comprise a restricted amount of Mg and by having a controlled purposive amount of Mg in the 3xxx series aluminum alloy core layer, some of the Mg will diffuse with time into the Al—Si brazing clad layer during the heat-up cycle of a brazing operation and provide a delayed evaporation of Mg. Thereby, the formation of excessive Mg-oxide at an early stage of the brazing operation is avoided, leading to an improved brazing performance in an inert-gas atmosphere without a flux.

In an embodiment, the aluminium core alloy layer is made from a 3xxx series aluminium alloy consisting of, in wt. %:
0.5% to 1.8% Mn, preferably 0.6% to 1.5%, and more preferably 0.8% to 1.3%;
0.20% to 0.75% Mg, preferably 0.20% to 0.60%;
up to 1.1% Cu, and preferably up to 0.15% or in a range of 0.15% to 1.1%, and preferably 0.20% to 0.9%, and more preferably 0.20% to 0.60%;
up to 0.4% Si, for example, up to 0.2% Si, and preferably <0.10%;
up to 0.7% Fe, preferably up to 0.5%, and more preferably in a range of 0.05% to 0.35%;
up to 0.3% Cr, preferably up to 0.20%, and more preferably up to 0.09%, and most preferably up to 0.04%;
up to 0.3% Sc, preferably up to 0.25%;
up to 0.3% Zr and/or V, preferably up to 0.09%, and more preferably up to 0.04%;
up to 0.25% Ti, preferably 0.01% to 0.20%, more preferably 0.01% to 0.12%;
up to 1.2% Zn, preferably up to 0.5%, and most preferably up to 0.2%;
aluminium and impurities. Typically, impurities are each up to 0.05% maximum and in total about 0.2% maximum, and preferably in total not exceeding about 0.15%.

The Mn content in the aluminium alloy core layer can be from about 0.5% to 1.8% Mn, (e.g., from 0.6% to 1.5%, from 0.7% to 1.4%, from 0.8% to 1.3%, or from 0.9% to 1.2%). Optionally, the Mn content can be about 0.5%, about 0.55%, about 0.6%, about 0.65%, about 0.7%, about 0.75%, about 0.8%, about 0.85%, about 0.9%, about 0.95%, about 1%, about 1.05%, about 1.1%, about 1.15%, about 1.2%, about 1.25%, about 1.3%, about 1.35%, about 1.4%, about 1.45%, about 1.5%, about 1.55%, about 1.6%, about 1.65%, about 1.7%, about 1.75%, or about 1.8%.

The Mg content in the aluminium alloy core layer can be from about 0.2% to 0.75% Mg (e.g., from 0.20% to 0.60%, from 0.25% to 0.55%, from 0.30% to 0.50%, or from 0.35% to 0.45%). Optionally, the Mg content can be about 0.2%, about 0.25%, about 0.3%, about 0.35%, about 0.4%, about 0.45%, about 0.5%, about 0.55%, about 0.6%, about 0.65%, about 0.7%, or about 0.75%.

The Cu content in the aluminium alloy core layer can be up to 1.1% Cu (e.g., up to 0.15%, from 0.15% to 1.1%, from 0.20% to 0.9%, or from 0.20% to 0.60%). Optionally, the Cu content can be greater than about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1%, about 1.05%, or about 1.1%.

The Si content in the aluminium alloy core layer can be up to 0.4% Si, up to 0.3% Si, or up to 0.2% Si (e.g., less than 0.10%, from 0.01% to 0.2%, from 0.05% to 0.4%, from 0.05% to 0.3%, from 0.1% to 0.4%, from 0.05% to 0.2%, or from 0.05% to 0.10%). Optionally, the Si content can be about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, about 0.2%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, about 0.35%, about 0.36%, about 0.37%, about 0.38%, about 0.39%, or about 0.4%.

The Fe content in the aluminium alloy core layer can be up to 0.7% Fe (e.g., up to 0.5%, from 0.05% to 0.35%, from 0.06% to 0.35%, from 0.1% to 0.3%, or from 0.15% to 0.25%). Optionally, the Fe content can be about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, or about 0.7%.

The Cr content in the aluminium alloy core layer can be up to 0.3% Cr (e.g., up to 0.20%, up to 0.09%, up to 0.04%, from 0.05% to 0.3%, from 0.1% to 0.25%, or from 0.15% to 0.2%). Optionally, the Cr content can be about 0.01%, about 0.05%, about 0.1%, about 0.15%, about 0.2%, about 0.25%, or about 0.3%.

The Sc content in the aluminium alloy core layer can be up to 0.3% Sc (e.g., up to 0.25%, up to 0.20%, up to 0.09%, up to 0.04%, from 0.05% to 0.3%, from 0.1% to 0.25%, or from 0.15% to 0.2%). Optionally, the Sc content can be about 0.01%, about 0.05%, about 0.1%, about 0.15%, about 0.2%, about 0.25%, or about 0.3%.

The Zr and/or V content in the aluminium alloy core layer can be up to 0.3% Zr and/or V(e.g., up to 0.25%, up to 0.20%, up to 0.09%, up to 0.04%, from 0.05% to 0.3%, from 0.1% to 0.25%, or from 0.15% to 0.2%). Optionally, the Zr and/or V content can be about 0.01%, about 0.05%, about 0.1%, about 0.15%, about 0.2%, about 0.25%, or about 0.3%.

The Ti content in the aluminium alloy core layer can be up to 0.25% Ti (e.g., from 0.01% to 0.20% or from 0.01% to 0.12%). Optionally, the Ti content can be about 0.01%, about 0.05%, about 0.1%, about 0.15%, about 0.2%, or about 0.25%.

The Zn content in the aluminium alloy core layer can be up to 1.2% Zn (e.g., up to 0.5%, up to 0.2%, from 0.05% to 1.2%, from 0.06% to 1.2%, from 0.1% to 1.0%, or from 0.25% to 0.8%). Optionally, the Zn content can be about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1%, about 1.05%, about 1.1%, about 1.15%, or about 1.2%.

The aluminium alloy core layer also includes aluminium and impurities, as described above.

Optionally, the aluminium core alloy layer is made from a 3xxx series aluminium alloy according to one of the following aluminium alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

In an embodiment the covering clad layer is free of wetting elements or elements modifying the surface tension of a molten Al—Si alloy, selected from the group of Ag, Be, Bi, Ca, Ce, La, Li, Na, Pb, Se, Sb, Sr, Th, and Y. With "free" is meant that no purposeful addition of Ag, Be, Bi, Ca, Ce, La, Li, Na, Pb, Se, Sb, Sr, Th, or Y is made to the chemical composition but that due to impurities and/or leaking from contact with manufacturing equipment, trace quantities of the element may nevertheless find its way into the covering material layer. In practice, this means that the amount present of each of these defined elements, if present, is up to about 0.005%, typically less than about 0.001%. For example, less than 10 ppm Sr, and preferably less than 5 ppm Sr, is an example of a trace quantity. And less than 10 ppm Na, and preferably less than 3 ppm Na, is another example of a trace quantity.

The covering clad layer is preferably free from Mg, meaning that the level is below about 0.05%, such as below about 0.03% or below 0.01%. With "free" is meant that no purposeful addition of Mg is made to the chemical composition but that due to impurities and/or leaking from contact with manufacturing equipment, trace quantities of the element may nevertheless find its way into the covering material layer.

In an embodiment the covering clad layer is a Mg-free aluminium alloy comprising, in wt. %,
Si 2% to 5%, preferably 2.5% to 4.0%, more preferably 3.0% to 3.9%;
Fe up to 0.5%, preferably up to 0.3%;
Mn up to 0.2%, preferably up to 0.10%;
Cu up to 0.1%, preferably up to 0.05%;
Zn up to 0.4%, preferably up to 0.2%;
Ti up to 0.1%, preferably up to 0.05%;
inevitable impurities, each <0.05%, total <0.15%, and preferably each <0.02% and total <0.05%, and aluminium.

The Si content in the covering clad layer can be from 2% to 5% (e.g., from 2.5% to 4.0%, or from 3.0% to 3.9%). Optionally, the Si content can be about 0.2%, about 0.25%, about 0.3%, about 0.35%, about 0.4%, about 0.45%, or about 0.5%.

The Fe content in the covering clad layer can be up to 0.5% (e.g., up to 0.3%, from 0.05% to 0.5%, from 0.1% to 0.4%, from 0.15% to 0.4%, or from 0.2% to 0.35%). Optionally, the Fe content can be about 0.05%, about 0.1%, about 0.15%, about 0.2%, about 0.25%, about 0.3%, about 0.35%, about 0.4%, about 0.45%, or about 0.5%.

The Mn in the covering clad layer can be up to 0.2% (e.g., up to 0.10%, from 0.05% to 0.2%, from 0.1% to 0.2%, or from 0.15% to 0.2%). Optionally, the Mn content can be about 0.05%, about 0.1%, about 0.15%, or about 0.2%.

The Cu in the covering clad layer can be up to 0.1% (e.g., up to 0.05%, from 0.01% to 0.1%, from 0.05% to 0.1%, or from 0.06% to 0.1%). Optionally, the Cu content can be about 0.01%, about 0.02%, about 0.03%, about 0.04%, about 0.05%, about 0.06%, about 0.07%, about 0.08%, about 0.09%, or about 0.1%.

The Zn in the covering layer can be up to 0.4% (e.g., up to 0.3%, up to 0.2%, up to 0.1%, from 0.01 to 0.4%, from 0.05 to 0.4%, from 0.06% to 0.35%, from 0.1% to 0.35%, or from 0.15% to 0.3%). Optionally, the Zn content can be about 0.05%, about 0.1%, about 0.15%, about 0.2%, about 0.25%, about 0.3%, about 0.35%, or about 0.4%

The Ti in the covering clad layer can be up to 0.1% (e.g., up to 0.05%, from 0.01% to 0.1%, from 0.05% to 0.1%, or from 0.06% to 0.1%). Optionally, the Ti content can be about 0.01%, about 0.02%, about 0.03%, about 0.04%, about 0.05%, about 0.06%, about 0.07%, about 0.08%, about 0.09%, or about 0.1%.

The covering clad layer also includes aluminium and impurities, as described above.

In an embodiment, the covering clad layer is a Mg-free aluminium alloy consisting of, in wt. %,
Si 2% to 5%,
Fe up to 0.5%,
Mn up to 0.2%,
Cu up to 0.1%,
Zn up to 0.4%,
Ti up to 0.1%,
inevitable impurities, each <0.05% and total <0.15%, aluminium, and with optional narrower ranges as herein described and claimed.

In some examples, the Al—Si brazing clad layer has the following composition, comprising of, in wt. %,
Si 7% to 13%, preferably 10%-13%, more preferably 11 to 13%;
Mg up to 0.5%, preferably 0.02% to 0.5%, and more preferably 0.02% to 0.20%;
Fe up to 0.7%, preferably up to 0.5%;
Cu up to 0.3%, preferably up to 0.1%;
Mn up to 0.8%, preferably up to 0.2%;
Zn up to 2%, preferably up to 0.3%;
Ti up to 0.25%;
aluminium, and unavoidable impurities each <0.05%, total <0.2%.

In a particular embodiment, the Al—Si brazing clad layer may further comprise up to 0.3% Bi, preferably 0.1% to 0.3%, more preferably 0.11% to 0.20%, to enhance joint formation during brazing.

The Si in the Al—Si brazing clad layer can be 7% to 13% (e.g., from 10% to 13%, from 11% to 13%, from 7.5% to 12.5%, or from 8% to 12%). Optionally, the Si content can be about 7%, about 7.05%, about 7.1%, about 7.15%, about 7.2%, about 7.25%, about 7.3%, about 7.35%, about 7.4%, about 7.45%, about 7.5%, about 7.55%, about 7.6%, about 7.65%, about 7.7%, about 7.75%, about 7.8%, about 7.85%, about 7.9%, about 7.95%, about 8%, about 8.05%, about 8.1%, about 8.15%, about 8.2%, about 8.25%, about 8.3%, about 8.35%, about 8.4%, about 8.45%, about 8.5%, about 8.55%, about 8.6%, about 8.65%, about 8.7%, about 8.75%, about 8.8%, about 8.85%, about 8.9%, about 8.95%, about 9%, about 9.05%, about 9.1%, about 9.15%, about 9.2%, about 9.25%, about 9.3%, about 9.35%, about 9.4%, about 9.45%, about 9.5%, about 9.55%, about 9.6%, about 9.65%, about 9.7%, about 9.75%, about 9.8%, about 9.85%, about 9.9%, about 9.95%, about 10%, %, about 10.05%, about 10.1%, about 10.15%, about 10.2%, about 10.25%, about 10.3%, about 10.35%, about 10.4%, about 10.45%, about 10.5%, about 10.55%, about 10.6%, about 10.65%, about 10.7%, about 10.75%, about 10.8%, about 10.85%, about 10.9%, about 10.95%, about 11%, about 11.05%, about 11.1%, about 11.15%, about 11.2%, about 11.25%, about 11.3%, about 11.35%, about 11.4%, about 11.45%, about 11.5%, about 11.55%, about 11.6%, about 11.65%, about 11.7%, about 11.75%, about 11.8%, about 11.85%, about 11.9%, about 11.95%, about 12%, about 12.05%, about 12.1%, about 12.15%, about 12.2%, about 12.25%, about 12.3%, about 12.35%, about 12.4%, about 12.45%, about 12.5%, about 12.55%, about 12.6%, about 12.65%, about 12.7%, about 12.75%, about 12.8%, about 12.85%, about 12.9%, about 12.95%, or about 13%.

The Mg in the Al—Si brazing clad layer can be up to 0.5% (e.g., from 0.01% to 0.5%, from 0.02% to 0.5%, from 0.02% to 0.4%, from 0.02% to 0.3%, from 0.02% to 0.2%, from 0.05% to 0.5%, from 0.1% to 0.5%, from 0.1% to 0.4%, or from 0.1% to 0.3%). Optionally, the Mg content can be about 0.01%, about 0.02%, about 0.03%, about 0.04%, about 0.05%, about 0.06%, about 0.07%, about 0.08%, about 0.09%, about 0.1%, about 0.15%, about 0.2%, about 0.25%, about 0.3%, about 0.35%, about 0.4%, about 0.45%, or about 0.5%.

The Fe in the Al—Si brazing clad layer can be up to 0.7% (e.g., up to 0.5%, from 0.05% to 0.35%, from 0.06% to 0.35%, from 0.1% to 0.3%, or from 0.15% to 0.25%). Optionally, the Fe content can be about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, or about 0.7%.

The Cu in the Al—Si brazing clad layer can be up to 0.3% (e.g., up to 0.2%, up to 0.1%; up to 0.09%, up to 0.04%, from 0.05% to 0.3%, from 0.1% to 0.25%, or from 0.15% to 0.2%). Optionally, the Cu content can be about 0.01%, about 0.05%, about 0.1%, about 0.15%, about 0.2%, about 0.25%, or about 0.3%.

The Mn in the Al—Si brazing clad layer can be up to 0.8% (e.g., up to 0.6%, up to 0.4%, up to 0.2%, from 0.05% to 0.8%, from 0.1% to 0.7%, from 0.2% to 0.6%, or from 0.25% to 0.55%). Optionally, the Mn content can be about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, or about 0.8%.

The Zn in the Al—Si brazing clad layer can be up to 2% (e.g., up to 1%, up to 0.5%, up to 0.3%, from 0.01% to 0.3%, from 0.05% to 0.3%, or from 0.05% to 0.2%). Optionally, the Zn content can be about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, about 0.19%, or about 0.2%.

The Ti in the Al—Si brazing clad layer can be up to 0.25% (e.g., up to 0.20%, up to 0.09%, up to 0.04%, from 0.05% to 0.25%, from 0.1% to 0.25%, or from 0.15% to 0.2%). Optionally, the Ti content can be about 0.01%, about 0.05%, about 0.1%, about 0.15%, about 0.2%, or about 0.25%.

The Bi in the Al—Si brazing clad layer can be up to 0.3% Bi, (e.g., up to 0.20%, up to 0.09%, up to 0.04%, from 0.1% to 0.3%, from preferably 0.11% to 0.20%, from 0.05% to 0.3%, from 0.1% to 0.25%, or from 0.15% to 0.2%). Optionally, the Bi content can be about 0.01%, about 0.05%, about 0.1%, about 0.15%, about 0.2%, about 0.25%, or about 0.3%.

The Al—Si brazing clad layer also includes aluminium and impurities, as described above.

In some examples, the Al—Si brazing clad layer has the following composition, consisting of, in wt. %,
Si 7%-13%, preferably 10%-13%, more preferably 11-13%;
Mg up to 0.5%, preferably 0.02% to 0.5%, and more preferably 0.02% to 0.20%;
Fe up to 0.7%, preferably up to 0.5%;
Cu up to 0.3%, preferably up to 0.1%;
Mn up to 0.8%, preferably up to 0.2%;
Zn up to 2%, preferably up to 0.3%;
Bi up to 0.3%, preferably 0.1% to 0.3%;
Ti up to 0.25%;
aluminium, and unavoidable impurities each <0.05%, total <0.2%.

In some examples of the aluminium alloy multi-layered brazing sheet material described herein, the 3xxx alloy core layer is provided on both sides with the covering clad layer and the Al—Si brazing clad layer. When both sides of the 3xx alloy core layer are clad in the same manner, the brazing sheet material consists of a five-layer configuration.

In an embodiment, the aluminium alloy multi-layered brazing sheet material is devoid or free from of an aluminium alloy layer interposed between the 3xxx alloy core layer and the Al—Si brazing clad layer as this would hinder the diffusion of the Mg from the 3xxx alloy core layer into the Al—Si brazing clad layer.

The aluminium alloy multi-layered brazing sheet material as described herein can be manufactured via various techniques. For example, the aluminum alloy multi-layered brazing sheet material can be manufactured by means of roll bonding as understood by those of skill in the art. The process may generally comprise the following steps:

casting the different aluminium alloys to obtain rolling blocks;

scalping of the blocks on either side to remove surface segregation zones originating from the casting process and to improve product flatness;

preheating of the brazing material blocks at 400° C. to 550° C.;

hot rolling of the blocks forming the covering layer and the Al—Si brazing clad layer until the desired thickness to provide multiple hot rolled clad liners;

alternatively, hot rolling the blocks of the covering layer and the Al—Si brazing clad layer to intermediate thickness and stacking the two materials at intermediate thickness and further hot rolling the stack to provide a hot rolled clad liner of required thickness composed of the two layers;

optionally homogenizing the aluminium core alloy block at 500° C. to 630° C. for at least 1 hour, preferably 1 to 20 hours;

assembling the core alloy block with at least on one face, optionally on both faces, the rolled clad liner(s) to obtain a sandwich;

preheating the sandwich at 400° C. to 550° C.;

hot rolling the sandwich until an intermediate thickness, for example 2 to 10 mm; cold rolling the hot rolled sandwich until the desired final thickness to obtain a multi-layered brazing sheet product; and optionally annealing at 200° C. to 480° C. to obtain a multi-layered brazing sheet product of the desired temper, for example O-temper, H1x-temper, H2x-temper or H3x-temper.

Alternatively, on a less preferred basis, one or more of the covering clad layer and the Al—Si brazing clad layer can be applied onto the 3xxx alloy core layer by means of thermal spraying techniques. In other cases, the core aluminium alloy layer and the Al—Si alloy brazing clad layer can be manufactured by means of casting techniques, for example as disclosed in international patent document WO-2004/112992, which is incorporated herein by reference in its entirety, where after the covering clad layer can be applied by means of for example roll bonding or thermal spraying techniques.

In an embodiment, the aluminium alloy multi-layered brazing sheet material thus obtained is treated with an alkaline or acidic etchant before the brazing process to remove a surface oxide film to facilitate the fluxless CAB brazing operation.

Preferably, the outer-surface of the aluminium alloy multi-layered brazing sheet material is treated with an acidic etchant. The acidic etchant preferably comprises H2SO4 in an amount of 10 g/L to 25 g/L (e.g., 12 g/L to 16 g/L, or 14 g/L). The acidic etchant can also include HF in an amount of 0.5 g/L to 5 g/L (e.g., 1 g/L to 3 g/L, or 2 g/L of HF (5%)).

The acidic etchant may comprise at least one of the following mineral acids: $H_2SO_4$, $H_3PO_4$, HCl, HF and/or $HNO_3$. Preferably, the acidic etchant is a mixture of $H_2SO_4$ and HF. The acidic etchant is generally in the form of a solution and the mineral acid content is generally from 0.5 to 20 wt. % (e.g., 1 to 20 wt. %, 2 to 18 wt. %, 3 to 16 wt. %, 4 to 15 wt. %, 5 to 12.5 wt. %, or 6 to 10 wt. %).

According to another embodiment the etchant may be alkaline. The alkaline etchant may comprise at least one of the following: NaOH and/or KOH. The alkaline etchant is generally in the form of a solution and the alkaline content is generally from 0.5 to 20 wt. % (e.g., 1 to 20 wt. %, 2 to 18 wt. %, 3 to 16 wt. %, 4 to 15 wt. %, 5 to 12.5 wt. %, or 6 to 10 wt. %).

The alkaline etchant may further comprise surfactants (for example, anionic surfactants such as alkylbenzene sulfonates, alkyl sulfates, alkyl ether sulfates; cationic surfactants such as mono alkyl quaternary systems; non-ionic surfactants such as with ester, ether or amide bonding (for example glycol esters); or amphoteric surfactants such as imidazoline derivatives or polypeptides) or complexing agents (for example sodium gluconate, sorbitol, mucic acid or Arabic gum).

The alkaline etchant generally needs to be rinsed with an acid, for example nitric or sulfuric acid.

The surface treatment with an etchant generally lasts from 1 second to 5 minutes, preferably from 3 seconds to 80 seconds, more preferably from 5 seconds to 50 seconds.

The temperature during this surface treatment is generally from 20° C. to 100° C., preferably from 30° C. to 80° C., more preferably 50° C. to 80° C.

During the surface treatment, the amount of removed aluminium of the clad outer layer side is 1 to 1000 mg/m$^2$ per side, preferably 5 to 500 mg/m$^2$ per side, more preferably 5 to 300 mg/m$^2$ per side.

The aluminium alloy multi-layered brazing sheet material described herein has a typical thickness at final gauge in the range of about 0.05 mm to 4 mm, and preferably about 0.2 mm to 2 mm, and more preferably about 0.2 mm to 1.5 mm.

In an embodiment each covering clad layer has a thickness which is about 0.5% to 10%, preferably 0.5% to 5%, of the entire thickness of the multi-layered brazing sheet, and each Al—Si brazing clad layer has a thickness which is about 3% to 25%, preferably about 4% to 15%, of the entire thickness of the aluminium alloy multi-layered brazing sheet.

In an embodiment the covering clad layer has a thickness in the range of 4 μm to 80 μm, preferably in a range of 5 μm to 50 μm.

It is important to keep the thickness of the covering clad layer thin compared to the thickness of the Al—Si brazing clad layer. The covering clad layer has a thickness $X_1$ and the Al—Si brazing clad layer has a thickness $X_2$ and the thickness ratio ($X_2$ to $X_1$) of the Al—Si alloy brazing clad layer and the covering clad layer is 2 or more to 1. In an embodiment, the thickness ratio is 2.5 or more to 1, and preferably $X_2 \geq 3.X_1$, for example the thickness ratio is 2.5 to 1, or 3 to 1, or 3.5 to 1.

Preferably the total of the thicknesses of the covering clad layer and the Al—Si brazing clad layer applied on a side of the core alloy layer are in a range of about 5% to 25%, preferably 5% to 15%, of the entire thickness of the multi-layered brazing sheet material.

In an embodiment, the aluminium alloy multi-layered brazing sheet material is provided in an O-temper, and which is fully annealed.

In an embodiment, the aluminium alloy multi-layered brazing sheet material is provided in a H3x-temper, H2x-temper or H1x-temper, and wherein x is 1, 2, 3, 4, 5, 6, 7 or 8, such as for example the H14, H18, H22, H24 and H26 temper.

As a particular example, the aluminium alloy multi-layered brazing sheet material is provided in an H24, a H16 or O-temper.

Also described herein is the use of the aluminium alloy multi-layered brazing sheet material or product for the production by means of a fluxfree controlled atmosphere brazing (CAB) operation of a heat exchanger, e.g. of a motor vehicle, and as such, the aluminium alloy multi-layered brazing sheet material is suitable for being applied in heat exchangers for powertrain and engine cooling radiators, low temperature radiators, direct air-to-air charge air cooling ("CAC") or intercooling, air-to-water CAC, water-to-air CAC, air-to-refrigerant CAC, refrigerant-to-air CAC, air-to-refrigerant evaporators, air-to-refrigerant condensers, water-to-refrigerant evaporators, water-to-refrigerant condensers, heater cores, exhaust gas cooling, exhaust gas recirculation systems, hybrid cooling system, two-phase cooling systems, oil coolers, fuel coolers, material for battery cooling systems, chillers, cold plates, heat recovery systems, etc.

In a further aspect, provided herein is an article comprising at least two formed members, for example formed by means of bending, folding, tube forming or deep drawing, joint to each other in a flux-free controlled atmosphere brazing (CAB) operation, in particular a heat-exchanger of a motor vehicle, incorporating at least the aluminium alloy multi-layered brazing material according to this invention as one of the formed members.

In another aspect, provided herein is a method of manufacturing an assembly of brazed components, comprising the steps of, in that order: providing or forming the components of which at least one is made from an aluminium alloy multi-layered brazing sheet product as herein set out or claimed; and preferably the multi-layered brazing sheet is treated with an alkaline or acidic etchant; assembling the components into an assembly; and preferably one side of the multi-layered brazing sheet of the invention having the covering clad layer is being kept inside the assembly forming the brazing sheet to constitute a structure, preferably a hollow structure; brazing the assembly without applying brazing flux in an inert gas atmosphere, e.g. argon or nitrogen, at a brazing temperature, typically at a temperature in a range of about 540° C. to 615° C., for example at about 590° C. or at about 600° C., for a period long enough for melting and spreading of the Al—Si brazing material, for example a dwell time of about 1 to 10 minutes, preferably 1 to 6 minutes, typically at around about 2 or 4 minutes, to form a fillet between the filler material and at least one other component; and wherein the oxygen content of the dry inert gas atmosphere is controlled to a level as low as possible, preferably below 200 ppm, and more preferably below 100 ppm, and more preferably below 40 ppm; and cooling of the brazed assembly, typically to below 100° C., e.g., to ambient temperature.

Ideally, when assembling the components into an assembly suitable for joining by brazing, one side of the multi-layered brazing sheet product as described herein and having the thin covering clad layer is kept inside the assembly forming the brazing sheet to constitute a structure. While using the brazing sheet product as described herein, there is no requirement to apply a brazing flux in order to obtain a good joint following the brazing operation.

In a preferred embodiment the brazing inert gas atmosphere during the brazing operation should be dry, meaning that the dew point is less than minus 40° C., and more preferably of minus 45° C. or even lower.

EXAMPLES

Figure 1B:
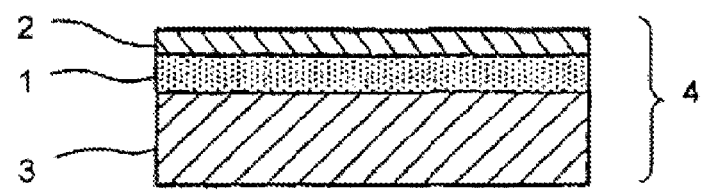

FIGS. 1A and 1B illustrate arrangements of the aluminium alloy multi-layered brazing sheet product 4 as described herein. The covering clad layer 2 and the Al—Si alloy brazing clad layer 1 can be applied on both sides or on one side only of the core layer 3 and wherein the covering clad layer 2 forms the outer-layer of the aluminium alloy multi-layered brazing sheet product. When both sides are clad, the multi-layered brazing sheet product has five layers including the core alloy layer as shown in FIG. 1A. When one side is clad with the brazing material, the multi-layered brazing sheet product has a three-layer configuration as shown in FIG. 1B.

Figure 2:
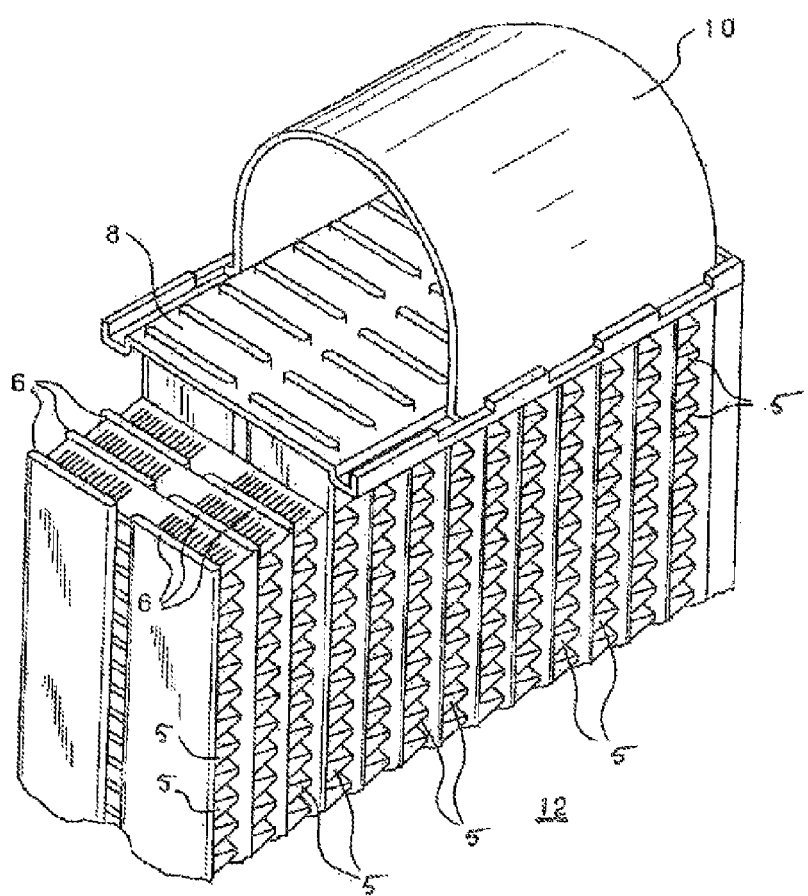
FIG. 2 is an isometric view of a portion of a brazed heat exchanger assembly.

FIG. 2 is an isometric view of a portion of a brazed heat exchanger assembly. As shown in FIG. 2, a brazed aluminium heat exchanger 12 in accordance with the present invention can include a plurality of fluid-carrying tubes 6 made from the multi-layered brazing sheet described herein. The ends of the fluid-carrying tubes 6 are open to a header plate 8 and a tank 10 (one end of the fluid-carrying tubes 6, one header plate 8 and one tank 10 are shown in FIG. 2). Coolant is circulated from the tank 10, through the fluid-carrying tubes 6 and into another tank (not shown). As shown, a plurality of cooling fins 7 are disposed between the fluid-carrying tubes 6 in order to transfer heat away therefrom, thereby facilitating a heat exchange cooling the fluid therein.

ILLUSTRATIONS

Illustration 1 is an aluminium alloy multi-layered brazing sheet product for brazing in an inert-gas atmosphere without a flux, comprising: a core layer made of a 3xxx alloy comprising 0.20% to 0.75 wt. % Mg, and provided with a covering clad layer comprising 2 wt. % to 5 wt. % Si on one or both sides of the 3xxx alloy core layer; and a Al—Si brazing clad layer comprising 7 wt. % to 13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$.

Illustration 2 is the aluminium alloy multi-layered brazing sheet product according to any preceding or subsequent illustration, wherein the 3xxx alloy core layer comprises 0.20% to 0.60% Mg.

Illustration 3 is the aluminium alloy multi-layered brazing sheet product according to any preceding or subsequent illustration, wherein the 3xxx alloy core layer comprises 0.20% to 0.30% Mg.

Illustration 4 is the aluminium alloy multi-layered brazing sheet product according to any preceding or subsequent illustration, wherein the 3xxx alloy core layer comprises 0.40% to 0.55% Mg.

Illustration 5 is the aluminium alloy multi-layered brazing sheet product according to any preceding or subsequent illustration, wherein the covering clad layer is Bi-free and Li-free.

Illustration 6 is the aluminium alloy multi-layered brazing sheet product according to any preceding or subsequent illustration, wherein the covering clad layer is Mg-free, Bi-free and Li-free, and comprises, in wt. %,
Si 2% to 5%;
Fe up to 0.5%;
Mn up to 0.2%;
Cu up to 0.1%;
Zn up to 0.4%;
Ti up to 0.1%;
inevitable impurities, each <0.05%, total <0.15%, and aluminium.

Illustration 7 is the aluminium alloy multi-layered brazing sheet product according to any preceding or subsequent illustration, wherein the covering clad layer has a Si content of 2.5% to 4.0%.

Illustration 8 is the aluminium alloy multi-layered brazing sheet product according to any preceding or subsequent illustration, wherein the 3xxx alloy core layer comprises, in wt. %,
0.5% to 1.8% Mn;
0.20% to 0.75% Mg;
up to 1.1% Cu;
up to 0.4% Si;
up to 0.7% Fe;
up to 0.3% Cr;
up to 0.3% Sc;
up to 0.3% Zr and/or V;
up to 0.25% Ti;
up to 1.2% Zn;
unavoidable impurities each up to 0.05% and total up to 0.2%, and aluminium.

Illustration 9 is the aluminium alloy multi-layered brazing sheet product according to any preceding or subsequent illustration, wherein the 3xxx alloy core layer comprises, in wt. %,
0.5% to 1.8% Mn;
0.20% to 0.75% Mg;
up to 1.1% Cu;
up to 0.2% Si;
up to 0.7% Fe;
up to 0.3% Cr;
up to 0.3% Sc;
up to 0.3% Zr and/or V;
up to 0.25% Ti;
up to 1.2% Zn;
unavoidable impurities each up to 0.05% and total up to 0.2%, and aluminium.

Illustration 10 is the aluminium alloy multi-layered brazing sheet product according to any preceding or subsequent illustration, wherein the 3xxx alloy core layer has a Si content less than 0.10%.

Illustration 11 is the aluminium alloy multi-layered brazing sheet product according to any preceding or subsequent illustration, wherein the 3xxx alloy core layer has a Cu content up to 0.15%.

Illustration 12 is the aluminium alloy multi-layered brazing sheet product according to any preceding or subsequent illustration, wherein the 3xxx alloy core layer has a Cu content in the range of 0.15% to 1.1%.

Illustration 13 is the aluminium alloy multi-layered brazing sheet product according to any preceding or subsequent illustration, wherein the Al—Si brazing clad layer comprises, in wt. %,
Si 7% to 13%;
Mg up to 0.5%;
Fe up to 0.7%;
Cu up to 0.3%;
Mn up to 0.8%;
Zn up to 2%;
Bi up to 0.3%;
Ti up to 0.25%;
unavoidable impurities each <0.05%, total <0.2%, and aluminium.

Illustration 14 is the aluminium alloy multi-layered brazing sheet product according to any preceding or subsequent illustration, wherein the Al—Si brazing clad layer comprises 10% to 13% Si.

Illustration 15 is the aluminium alloy multi-layered brazing sheet product according to any preceding or subsequent illustration, wherein the Al—Si brazing clad layer comprises 0.02% to 0.5% Mg.

Illustration 16 is the aluminium alloy multi-layered brazing sheet product according to any preceding or subsequent illustration, wherein the aluminium alloy multi-layered brazing sheet product is surface treated with an alkaline or acidic etchant before a brazing step.

Illustration 17 is the aluminium alloy multi-layered brazing sheet product according to any preceding or subsequent illustration, wherein the covering clad layer has a thickness $X_1$ and the Al—Si brazing clad layer has a thickness $X_2$ and wherein $X_2 \geq 2.5X_1$.

Illustration 18 is the aluminium alloy multi-layered brazing sheet product according to any preceding or subsequent illustration, wherein $X_2 \geq 3X_1$.

Illustration 19 is a process for the production of a braze heat exchanger, comprising the steps of providing at least one aluminium alloy multi-layered brazing sheet product according to any preceding or subsequent illustration; and brazing in a flux-free controlled atmosphere brazing (CAB).

Illustration 20 is the process of any preceding illustration, wherein the aluminium alloy multi-layered brazing sheet is surface treated with an alkaline or acidic etchant before a brazing step.

Illustration 21 is a use of an aluminium alloy multi-layered brazing sheet product according to any preceding or subsequent illustration in a flux-free controlled atmosphere brazing (CAB) operation to produce a heat exchanger apparatus.

All patents, publications and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. An aluminium alloy multi-layered brazing sheet product for brazing in an inert-gas atmosphere without a flux, comprising:
    a core layer made of a 3xxx alloy comprising 0.20% to 0.75 wt. % Mg, and provided with a covering clad layer comprising 2 wt. % to 5 wt. % Si on one or both sides of the 3xxx alloy core layer, wherein the covering clad layer comprises less than 0.005 wt. % of Bi; and
    an Al—Si brazing clad layer comprising 7 wt. % to 13 wt. % Si positioned between the 3xxx alloy core layer and the covering clad layer,
    wherein the covering clad layer has a thickness $X_1$ and the Al—Si brazing clad layer has a thickness $X_2$ and wherein $X_2 \geq 2X_1$.

2. The aluminium alloy multi-layered brazing sheet product according to claim 1, wherein the 3xxx alloy core layer comprises 0.20% to 0.60% Mg.

3. The aluminium alloy multi-layered brazing sheet product according to claim 1, wherein the 3xxx alloy core layer comprises 0.20% to 0.30% Mg.

4. The aluminium alloy multi-layered brazing sheet product according to claim 1, wherein the 3xxx alloy core layer comprises 0.40% to 0.55% Mg.

5. The aluminium alloy multi-layered brazing sheet product according to claim 1, wherein the covering clad layer comprises less than 0.005 wt. % Li.

6. The aluminium alloy multi-layered brazing sheet product according to claim 1, wherein the covering clad layer comprises, in wt. %,
    Si 2% to 5%;
    Fe up to 0.5%;
    Mn up to 0.2%;
    Cu up to 0.1%;
    Zn up to 0.4%;
    Ti up to 0.1%;
    Mg less than 0.05 wt. %;
    Li less than 0.005 wt. %;
    inevitable impurities, each <0.05%, total <0.15%, and aluminium.

7. The aluminium alloy multi-layered brazing sheet product according to claim 6, wherein the covering clad layer has a Si content of 2.5% to 4.0%.

8. The aluminium alloy multi-layered brazing sheet product according to claim 1, wherein the 3xxx alloy core layer comprises, in wt. %,
    0.5% to 1.8% Mn;
    0.20% to 0.75% Mg;
    up to 1.1% Cu;
    up to 0.4% Si;
    up to 0.7% Fe;
    up to 0.3% Cr;
    up to 0.3% Sc;
    up to 0.3% Zr and/or V;
    up to 0.25% Ti;
    up to 1.2% Zn;
    unavoidable impurities each up to 0.05% and total up to 0.2%, and aluminium.

9. The aluminium alloy multi-layered brazing sheet product according to claim 8, wherein the 3xxx alloy core layer has a Si content less than 0.10%.

10. The aluminium alloy multi-layered brazing sheet product according to claim 8, wherein the 3xxx alloy core layer has a Cu content up to 0.15%.

11. The aluminium alloy multi-layered brazing sheet product according to claim 8, wherein the 3xxx alloy core layer has a Cu content in a range of 0.15% to 1.1%.

12. The aluminium alloy multi-layered brazing sheet product according to claim 1, wherein the Al—Si brazing clad layer comprises, in wt. %,
    Si 7% to 13%;
    Mg up to 0.5%;
    Fe up to 0.7%;
    Cu up to 0.3%;
    Mn up to 0.8%;
    Zn up to 2%;
    Bi up to 0.3%;
    Ti up to 0.25%;
    unavoidable impurities each <0.05%, total <0.2%, and aluminium.

13. The aluminium alloy multi-layered brazing sheet product according to claim 12, wherein the Al—Si brazing clad layer comprises 10% to 13% Si.

14. The aluminium alloy multi-layered brazing sheet product according to claim 12, wherein the Al—Si brazing clad layer comprises 0.02% to 0.5% Mg.

15. The aluminium alloy multi-layered brazing sheet product according to claim 1, wherein the aluminium alloy multi-layered brazing sheet product is surface treated with an alkaline or acidic etchant before a brazing step.

16. The aluminium alloy multi-layered brazing sheet product according to claim 1, wherein the covering clad layer has a thickness $X_1$ and the Al—Si brazing clad layer has a thickness $X_2$ and wherein $X_2 \geq 2.5X_1$.

17. The aluminium alloy multi-layered brazing sheet product according to claim 16, wherein $X_2 \geq 3X_1$.

18. A process for producing a braze heat exchanger, comprising the steps of:
   providing at least one aluminium alloy multi-layered brazing sheet product according to claim 1; and
   brazing in a flux-free controlled atmosphere brazing (CAB).

19. The process of claim 18, wherein the aluminium alloy multi-layered brazing sheet is surface treated with an alkaline or acidic etchant before the brazing step.

* * * * *